United States Patent
Carter et al.

(10) Patent No.: US 6,457,231 B1
(45) Date of Patent: Oct. 1, 2002

(54) ASSEMBLY LINE HAVING TRANSVERSELY MOVABLE MULTIPLE PART TRAYS

(75) Inventors: Thomas J. Carter, Shelby Township Macomb County; Rudolph A. Gansler, Algonac, both of MI (US)

(73) Assignee: Utica Enterprises, Inc., Shelby Township, Macomb County, MI (US)

( * ) Notice: Subject to any disclaimer, the term of this patent is extended or adjusted under 35 U.S.C. 154(b) by 64 days.

(21) Appl. No.: 09/657,017

(22) Filed: Sep. 7, 2000

(51) Int. Cl.[7] .............................................. B23P 19/00
(52) U.S. Cl. ...................... 29/791; 29/783; 198/370.04; 414/225.01
(58) Field of Search ............... 198/370.04; 414/225.01; 29/791, 783, 711

(56) References Cited

U.S. PATENT DOCUMENTS

| | | | | |
|---|---|---|---|---|
| 4,278,165 A | * | 7/1981 | Nielsen et al. | |
| 4,819,699 A | * | 4/1989 | Brown et al. | |
| 4,928,383 A | * | 5/1990 | Kaczmarek | |
| 5,125,149 A | * | 6/1992 | Inaba et al. | |
| 5,152,050 A | * | 10/1992 | Kaczmarek et al. | 29/791 |
| 5,272,805 A | * | 12/1993 | Akeel et al. | 29/791 |
| 6,065,200 A | * | 5/2000 | Negre | |
| 6,098,268 A | * | 8/2000 | Negre et al. | |
| 6,256,868 B1 | * | 7/2001 | Sugito et al. | 29/83 |

* cited by examiner

Primary Examiner—David P. Bryant
Assistant Examiner—Steven A Blount
(74) Attorney, Agent, or Firm—Brooks & Kushman P.C.

(57) ABSTRACT

An assembly line (14) having particular utility for use in assembling sheet metal parts includes a work station (18) having one or more production part trays (32, 34), a pilot part tray (36) and an indexer (38) that indexes these part trays in a transverse direction to a direction of conveyance (C) of the assembly line to permit one of the two production part trays (32, 34) to be used for production or the pilot part tray (36) to be used for a future pilot test. Detachable couplings (56) allow the production and pilot part trays to be moved to a maintenance station (42, 44) that is outside of the assembly line work area (25).

6 Claims, 4 Drawing Sheets

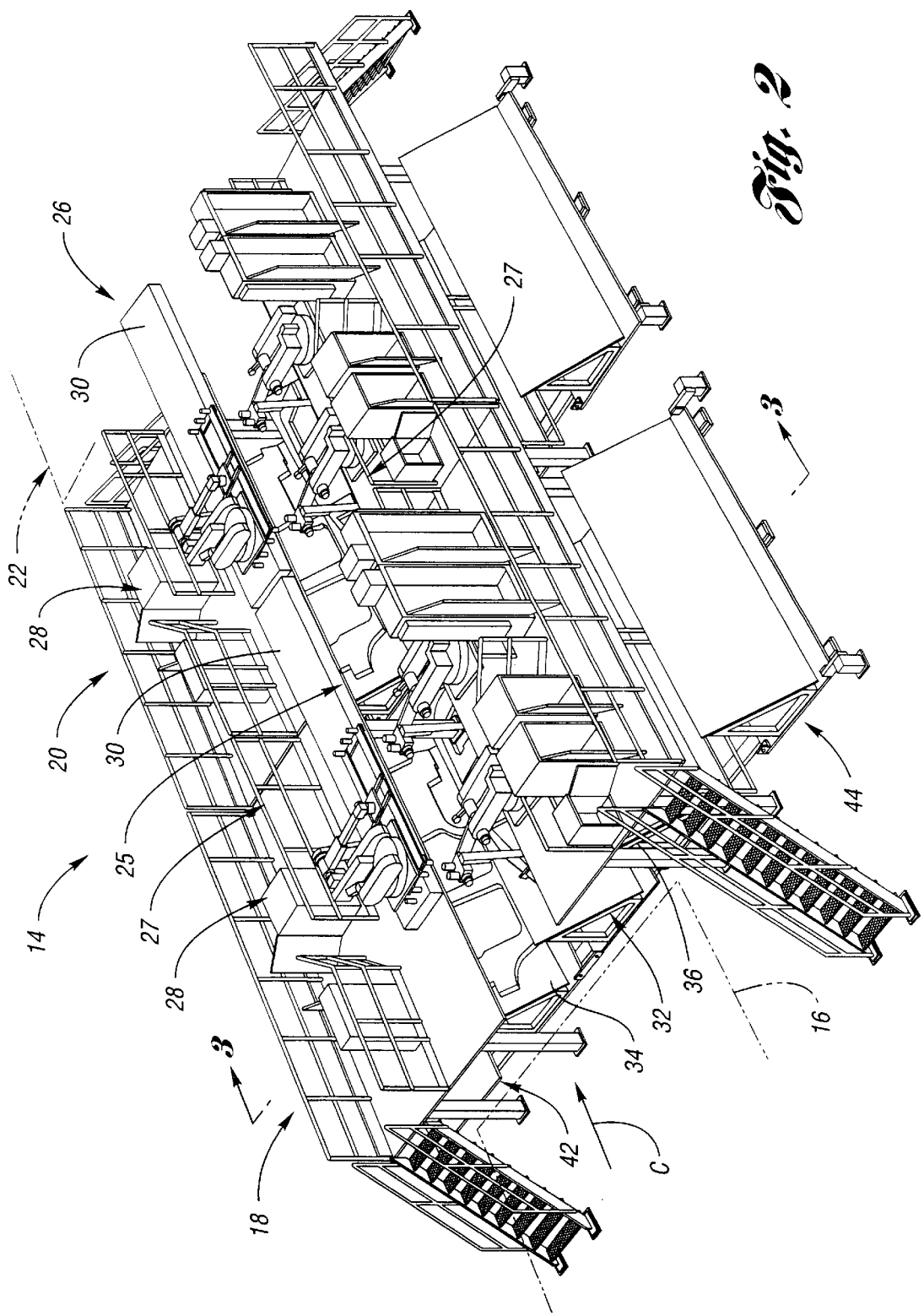

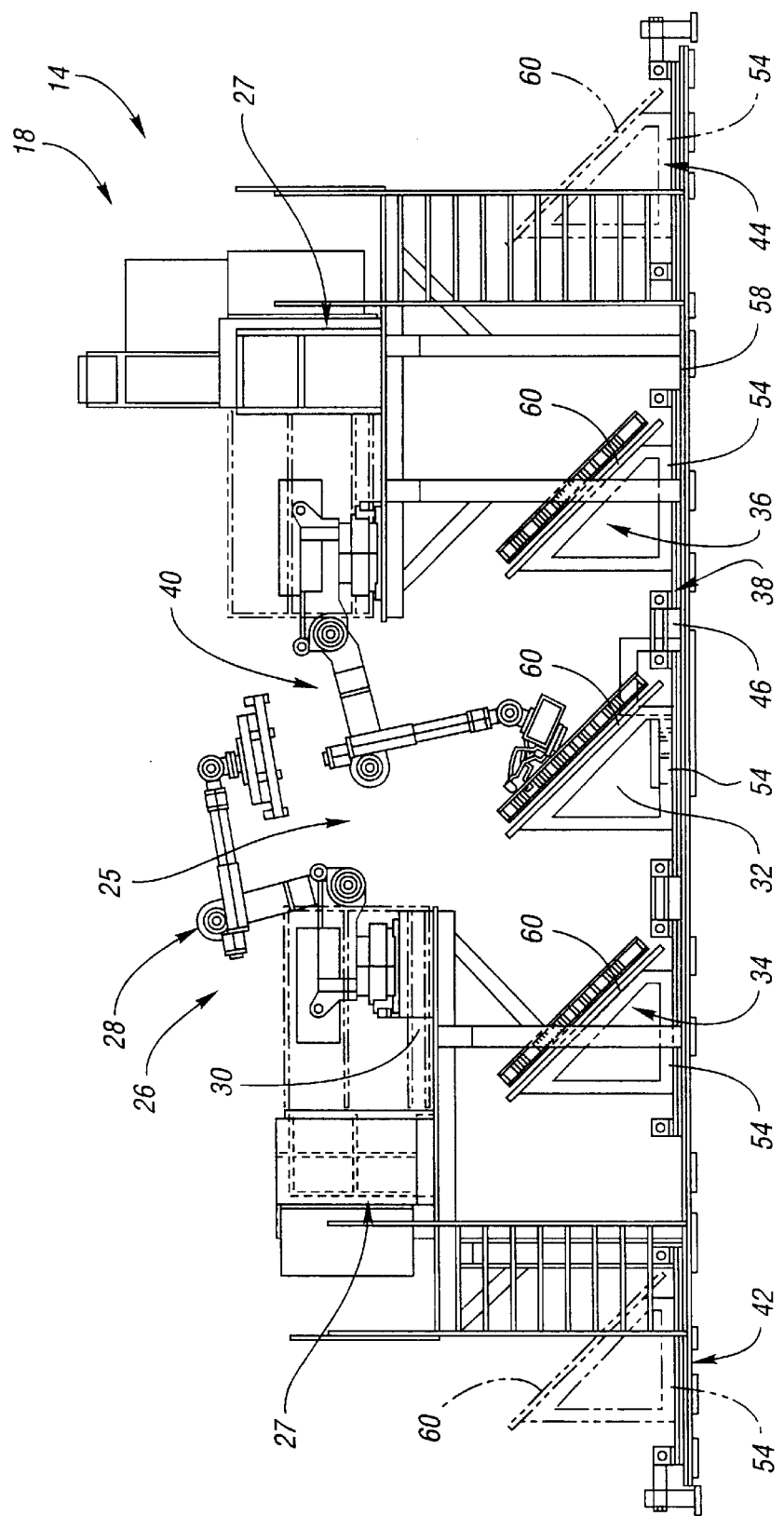

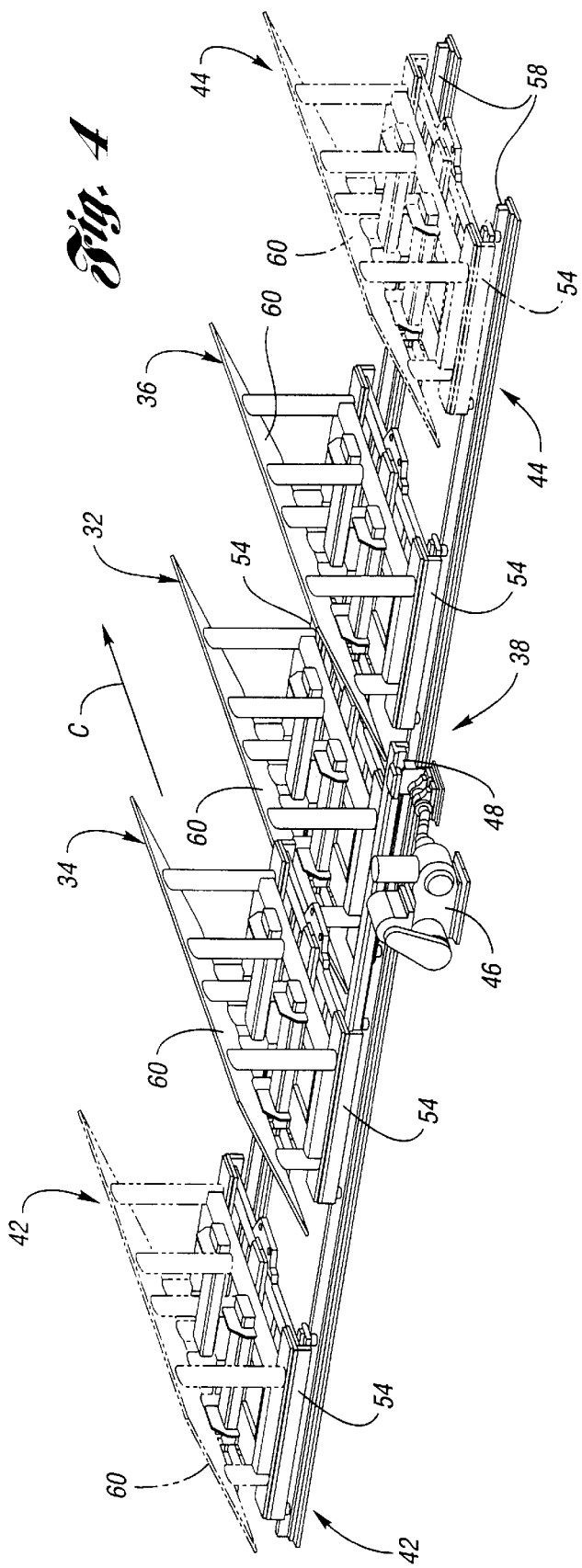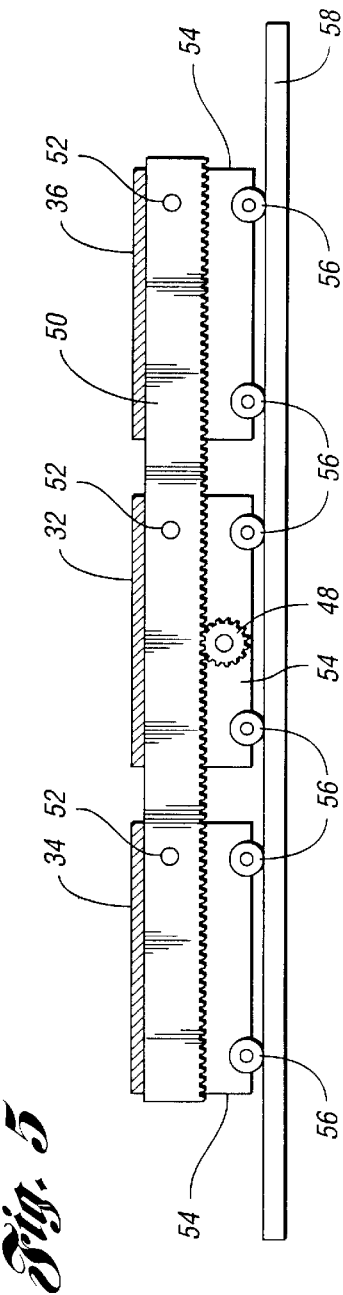

ASSEMBLY LINE HAVING TRANSVERSELY MOVABLE MULTIPLE PART TRAYS

TECHNICAL FIELD

This invention relates to an assembly line for assembling different combinations of parts and has particular utility for sheet metal assembly.

BACKGROUND ART

Assembly lines for assembling parts to each other have previously included a part tray that is movable laterally with respect to the direction of conveyance of the assembly line and has two different sets of fixtures to receive and support two different combinations of parts for assembly to each other in order to permit two different production runs to be tooled and alternately run without stoppage for tool setup. Such assembly lines have the part tray always located within the work area of the assembly line and require stoppage to permit adaptation for future pilot production runs so as to thereby decrease production and thus increase the production costs.

DISCLOSURE OF INVENTION

An object of the present invention is to provide an improved assembly line for assembling parts to each other.

In carrying out the above object, the assembly line of the invention includes a plurality of work stations positioned along a direction of conveyance of the assembly line and each work station has a work area where the assembly takes place. A conveyor of the assembly line conveys parts to be assembled from one work station to the next in a successive manner along the direction of conveyance. Each work station includes a production part tray for holding parts being assembled within the work area of the conveyor. One of the work stations also includes a pilot part tray for handling a combination of pilot parts to be assembled in preparation for future production. The one work station also including a maintenance station located laterally along the direction of conveyance from the work area. An indexer of the one work station indexes the pilot and production part trays of the one work station in a direction transverse to the direction of conveyance so as to permit one of the these part trays to be used in the assembly of its associated combination of parts in the work area, and the pilot part tray is movable to the maintenance station externally of the work area for work in preparation for the future production. The indexer includes a detachable coupling for attaching to the pilot part tray for the indexing and is detachable therefrom so the pilot part tray can be moved to the maintenance station.

In the preferred construction of the assembly line, the indexer of the assembly line also includes another detachable coupling for selectively attaching the production part tray for the indexing and for detachment therefrom for positioning at the maintenance station. More specifically, the one work station may include a pair of maintenance stations spaced from each other with the assembly line extending therebetween along the direction of conveyance, and the one work station may include a second production part tray. Either of the production part trays are movable to one of the pair of maintenance stations for maintenance and the pilot part tray can be moved to one of the pair of maintenance stations for work in preparation for future production. The indexer includes detachable couplings for selectively attaching the production and pilot part trays for the indexing and for the detachment therefrom for the positioning at the maintenance stations.

The objects, features and advantages of the present invention are readily apparent from the following detailed description of the best mode for carrying out the invention when taken in connection with the accompanying drawings.

BRIEF DESCRIPTION OF DRAWINGS

FIG. 2 is a perspective view of one of the assembly lines of the invention.

FIG. 3 is a cross sectional view of the assembly line of the invention taken along the direction of line 3—3 in FIG. 2.

FIG. 4 is a perspective view of part trays of one work station of the assembly line.

FIG. 5 is a view that illustrates connection and operation of an indexer for the part trays.

BEST MODE FOR CARRYING OUT THE INVENTION

Figure 1:
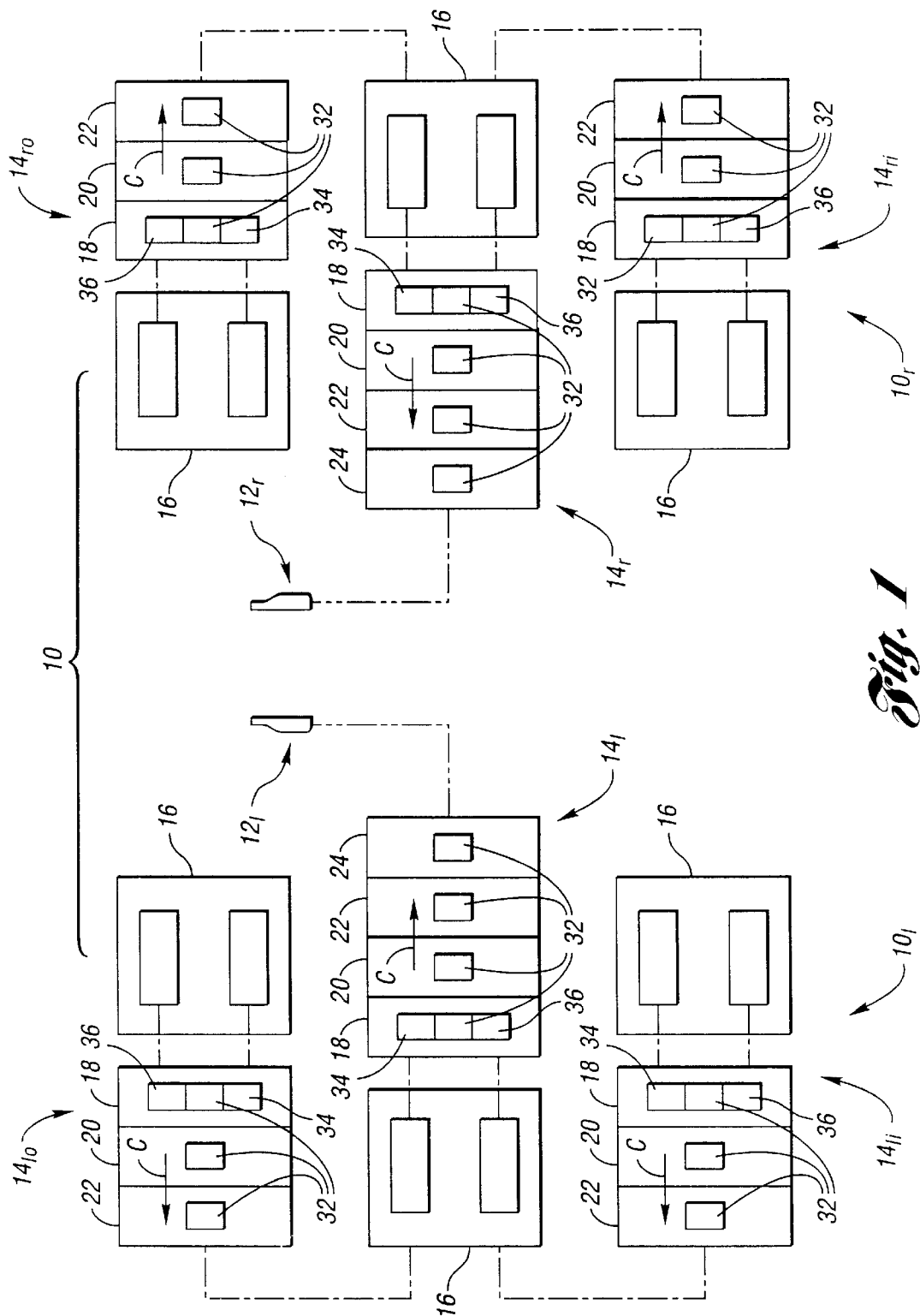
FIG. 1 is a schematic plan view of a welding system that includes assembly lines constructed in accordance with the invention.

With reference to FIG. 1 of the drawings, a welding system generally indicated by 10 includes subsystems $10_l$ and $10_r$ for welding left and right vehicle doors $12_l$ and $12_r$. The subsystems $10_l$ and $10_r$ include main assembly lines $14_l$ and $14_r$ that are respectively fed welded door inner and outer panels by feed assembly lines $14_{li}$, $14_{lo}$, and $14_{ri}$, $14_{ro}$. More specifically, the feed assembly lines $14_{li}$, $14_{lo}$ and $14_{ri}$, $14_{ro}$ respectively assemble left and right door inner and outer panels by welding any necessary plates, flanges or pillars, etc. to main inner and outer door panels, and the main assembly lines $14_l$ and $14_r$ assemble the inner and outer panels to each other by welding as is hereinafter more fully described.

Each of the assembly lines illustrated in FIG. 1 may include a loading station 16 for loading parts to be assembled by the welding. Thus, for the feed assembly lines $14_{li}$, $14_{lo}$, and $14_{ri}$, $14_{ro}$, these parts include the inner and outer panels and the necessary mounting plates, flanges or pillars that must be welded to provide the completed inner and outer panels. Furthermore, for the main assembly lines $14_l$ and $14_r$, the parts to be welded include the previously welded door inner and outer panels.

Each of the assembly lines illustrated in FIG. 1 includes a plurality of work stations 18, 20 and 22 positioned along an associated direction of conveyance C and the main assembly lines 14, and also include another work station 24 along the direction of conveyance. Each assembly line as illustrated by the assembly line 14 in FIG. 2 includes a work area 25 and has a drive conveyor 26 that moves the pieces to be welded from the loading station 16 to the work stations 18, 20 etc. in a successive manner for the welding operations. Safety fences 27 enclose the work area 25 of each work station. This drive conveyor 26 as illustrated includes material handling robots 28 that are mounted at one side of the assembly line and that are moved therealong by associated indexing slides 30 of any conventional type. Thus, the indexing slides 30 move the material handling robots 28 back and forth along the-direction- of conveyance to move the parts from the associated loading station 16 to the initial work station 18 and successively to the next work station 20, etc. as the laser welding proceeds. The drive conveyors can also be of other conventional types such as power roller and skid conveyors, overhead conveyors, and lift and carry conveyors, etc.

As illustrated in FIG. 1, each of the work stations 18, 20, 22 and 24 includes a part tray 32 and the initial work station 18 of each assembly line includes first and second part trays 32 and 34 for selectively handling two different combinations of production parts to be assembled by the welding within the work area. In addition, the initial work station 18 of each assembly line includes a pilot part tray 36 for handling another combination of pilot parts to be assembled in preparation for future production. Furthermore, the initial work station also includes an indexer 38 illustrated in FIGS. 4 and 5 for indexing the three part trays 32, 34 and 36 in a direction transverse to the direction of conveyance C of the associated conveyor so as to permit one of the three part trays to be used in the assembly of the associated combination of parts. Thus, two different production jobs of left and right doors can be run at any one time with the indexer 38 indexing the appropriate part tray for initially supporting the parts to be assembled by the welding within the work area, while the third part tray can be indexed into position within the work area to provide a trial run of pilot parts to be welded on a production basis in the future. Thus, this indexing permits efficient pilot operation in preparation for future production jobs without substantially interrupting current production jobs.

With continuing reference to FIG. 2 and additional reference to FIG. 3, each work station also includes a welding robot 40 for welding the parts to each other. More specifically, the welding robots 40 are located on the opposite side of the assembly line 14 from the material handling robots 28 of the drive conveyor 26 as is best illustrated in FIG. 3.

With continuing reference to FIG. 3, the work stations 18 each include a pair of maintenance stations 42 and 44 that are located outside of the safety fences 27 from the work area 25. The first and second production part trays 32 and 34 can be moved to the maintenance stations 42 and 44 for maintenance, and the pilot part tray 36 can likewise be moved to the maintenance stations 42 and 44 in preparation for future production.

As illustrated in FIGS. 4 and 5, the indexer 38 includes an electric servomotor 46 for indexing the part trays 32, 34 and 36 as described above. More specifically, the electric servomotor 46 has an output 48 that is embodied by a spur gear 48 illustrated in FIG. 5 for driving a rack 50 in a direction that is transverse to the direction of conveyance of the associated conveyor. Detachable couplings 52 which may be embodied by pins -or other suitable detachable connectors provide the detachable coupling of the part trays 32, 34 and 36 to the rack 50 for the indexing movement under the operation of the servomotor output spur gear 48. Detachment of the part trays 32, 34 or 36 from the rack 50 by detachment of the associated coupling 52 permits positioning thereof in one of the maintenance stations 42 or 44 for maintenance or future production preparation.

Each of the part trays 32, 34 and 36 as shown in FIGS. 4 and 5 includes a lower carriage 54 having wheels 56 that are supported by tracks 58 for movement under the impetus of the indexer 38 as previously described. An upper fixture tray 60 of each part tray is supported by its lower carriage 54 and includes suitable fixturing such as stops, positioning lugs and flanges etc. for locating and holding the parts being laser welded to each other.

The second, third and fourth work stations 20, 22 and 24 of the assembly lines shown in FIG. 1 are illustrated with only a single universal part tray 32 for holding the parts for additional welding after the initial welding at the initial work station 18 of each assembly line. However, it is also possible for these additional work stations to have first and second production part trays and a third pilot part tray for use with an associated indexer and maintenance stations in the same manner as the initial work station of the assembly line as described above. Likewise, the initial work station 18 can have one or more than two production part trays and can also have more than one pilot part trays.

While the present invention has particular utility with assembly of sheet metal parts such as by welding as described above, it should be appreciated that other assembly lines can also utilize the invention as defined by the following claims. Thus, while the best mode has been described in detail, those familiar with the art to which this invention relates will recognize various alternative designs and embodiments for practicing the invention as defined by the claims.

What is claimed is:

1. An assembly line comprising:
    a plurality of work stations positioned along a direction of conveyance of the assembly line, and each work station having a work area;
    a drive conveyor for conveying parts to be assembled from one work station to the next in a successive manner along the direction of conveyance;
    each work station including a production part tray for holding the parts being assembled within the work area of the work station; and
    one of the work stations also including a pilot part tray for handling a combination of pilot parts to be assembled in preparation for future production, the one work station also including a maintenance station located outside of the work area of the one work station, an indexer for indexing the production and pilot part trays of the one work station in a direction transverse to the direction of conveyance so as to permit one of the these part trays to be used in the assembly of its associated combination of parts in the work area, and the indexer including a detachable coupling for attaching to the pilot part tray for the indexing and being detachable therefrom so the pilot part tray can be moved to the maintenance station externally of the work area thereof in preparation for the future production.

2. An assembly line as in claim 1 wherein the indexer includes another detachable coupling for selectively attaching to the production part tray for the indexing and for detachment therefrom for positioning at the maintenance station.

3. An assembly line comprising:
    a plurality of work stations positioned along a direction of conveyance of the assembly line, and each work station having a work area;
    a drive conveyor for conveying parts to be assembled from one work station to the next in a successive manner along the direction of conveyance;
    each work station including a production part tray for holding the parts being assembled within the work area of the work station; and
    one of the work stations also including a pilot part tray for handling a combination of pilot parts to be assembled in preparation for future production, said one work station including a pair of maintenance stations spaced from each other outside of the work area with the assembly line extending therebetween along the direction of conveyance, the one work station including a second production part tray, an indexer including detachable couplings for selectively attaching to the production and pilot part trays of the one work station for indexing thereof in a direction transverse to the direction of conveyance so as to permit one of the these part trays to be used in the assembly of its associated combination of parts in the work area, and the detachable couplings of the indexer selectively being detachable from either of the production part trays for movement thereof to one of the pair of maintenance stations for maintenance and also selectively being detachable from the pilot part tray for movement thereof to one of the pair of maintenance stations for work in preparation for future production.

4. An assembly line as in claim 1 wherein at least one of the work stations includes a robot for securing sheet metal parts to each other.

5. A system including an assembly line for securing sheet metal parts to each other, comprising:

a plurality of work stations positioned along a direction of conveyance of the assembly line;

a drive conveyor for conveying sheet metal parts to be assembled from one work station to the next in a successive manner along the direction of conveyance;

each work station also including a robot for securing sheet metal parts to each other;

each work station including a part tray for holding the parts being assembled; and one of the work stations including first and second production part trays for selectively handling two different combinations of production parts to be assembled, said one work station also including a pilot part tray for handling another combination of pilot parts to be assembled in preparation for future production, the one work station including a maintenance station, and an indexer including detachable couplings for selectively attaching to the production and pilot part trays for indexing thereof in a direction transverse to the direction of conveyance so as to permit one of the three part trays to be used in the assembly of its associated combination of parts, and the detachable couplings selectively being detachable from either of the production part trays and the pilot part tray to permit movement thereof to the maintenance station for work in connection with the future production.

6. A system including an assembly line for securing sheet metal parts to each other, comprising:

a plurality of work stations positioned along a direction of conveyance of the assembly line;

a drive conveyor for conveying sheet metal parts to be assembled from one work station to the next in a successive manner along the direction of conveyance;

each work station also including a robot for securing sheet metal parts to each other;

each work station including a part tray for holding the parts being assembled; and one of the work stations including first and second production part trays for selectively handling two different combinations of production parts to be assembled, a pilot part tray for handling another combination of pilot parts to be assembled in preparation for future production, the one work station including a pair of maintenance stations on opposite sides thereof, an indexer for indexing the three part trays in a direction transverse to the direction of conveyance so as to permit one of the three part trays to be used in the assembling of its associated combination of parts, and detachable couplings for respectively coupling the production and pilot part trays to the indexer for the indexing and for uncoupling thereof for positioning at one of the maintenance stations.

* * * * *